Dec. 24, 1957  A. F. STAMM  2,817,251
POSITIVE DRIVE DIFFERENTIAL
Filed March 10, 1955  3 Sheets-Sheet 1

INVENTOR.
Alexander F. Stamm
BY
Harness and Harris
ATTORNEYS

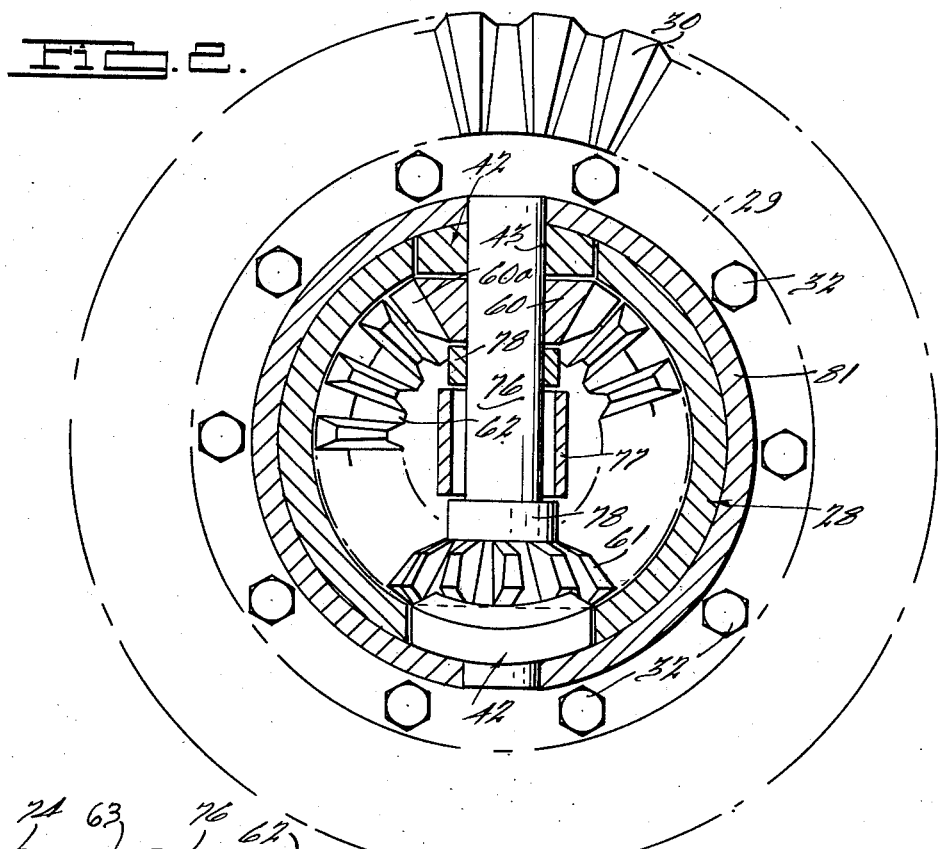

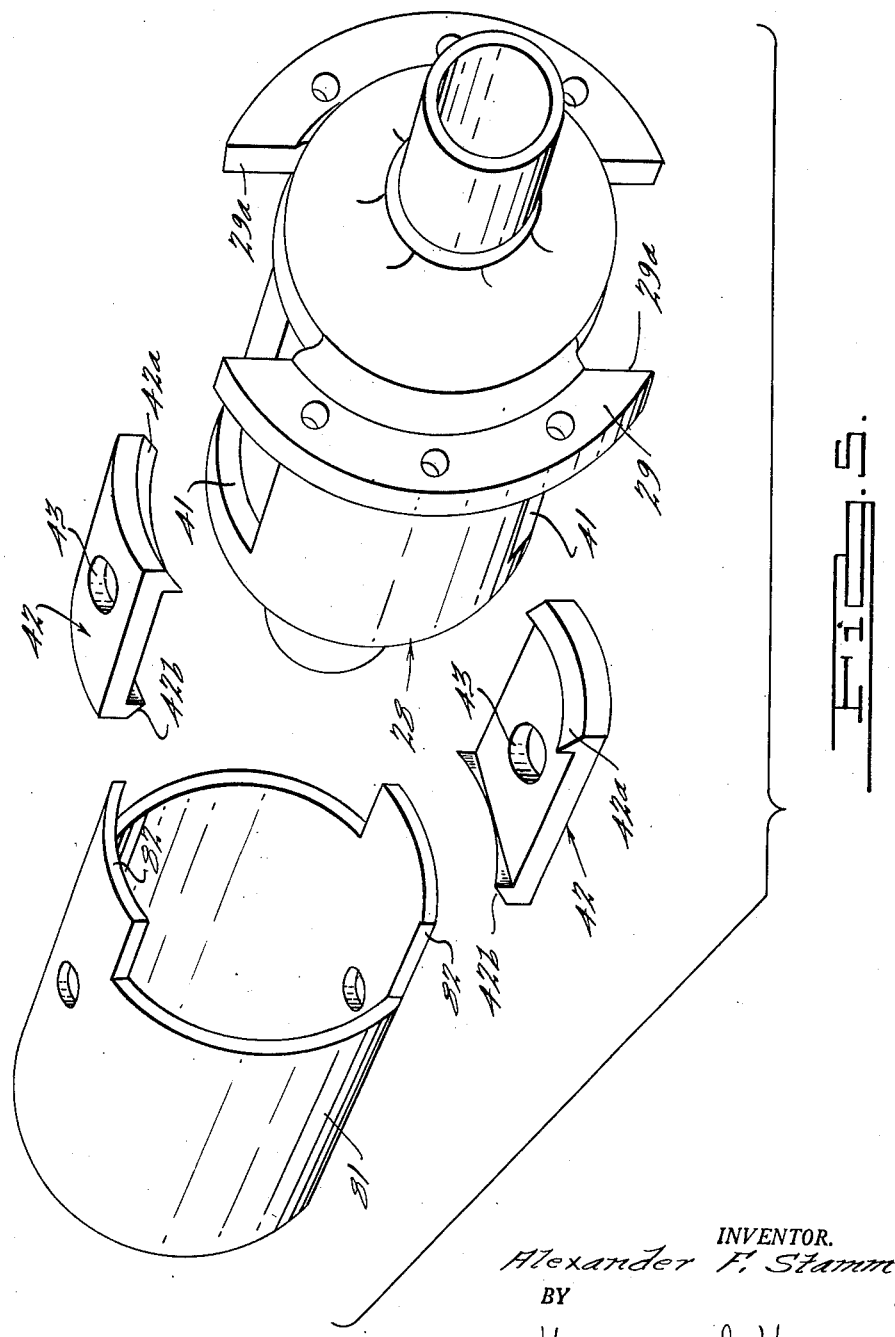

United States Patent Office 2,817,251
Patented Dec. 24, 1957

2,817,251
POSITIVE DRIVE DIFFERENTIAL

Alexander F. Stamm, Rochester, Mich., assignor to Chrysler Corporation, Highland Park, Mich., a corporation of Delaware Application March 10, 1955, Serial No. 493,322

16 Claims. (Cl. 74—711)

This invention relates to differential mechanisms of the type that are generally used for delivering torque from a drive shaft to the pair of transversely aligned, relatively rotatable, driven wheels of a motor vehicle drive train. This invention concerns an improvement in such differential mechanisms whereby a differential gearing lock-up is automatically effected whenever there is a tendency of one of the driven wheels to dissipate the torque applied thereto. By this invention the differential gearing is locked up so that it transmits a positive drive. This differential lock-up is effected by a friction clutch engaged by variation in gear separating forces resulting from a loss in tractive resistance at one of the wheels.

As is well known, a motor vehicle differential mechanism permits the application of torque to the two driven wheels in a manner which permits relative motion between said driven wheels so that the driven wheels of the vehicle may adapt their motion to the path of the vehicle. While the conventional differential mechanism is normally intended to apply equal torques to its two driven wheels, still, if one of the driven wheels slips, the slipping wheel cannot transmit any substantial amount of torque and in consequence of its dissipation of the torque applied thereto, little or no torque can be transmitted to the other non-slipping wheel. With the conventional differential mechanism if there is little or no tractive resistance on one or the other of the driven wheels, then substantially all the driving torque is dissipated through the slipping or freely spinning wheel and little effective tractive effort can be delivered to the other wheel that has tractive resistance.

It is a primary object of this invention to provide a locking differential that is simple in design, compact, inexpensive, one that uses a majority of standard differential parts, and one that is automatically operable to insure a positive drive as limited by the torque of the wheel having the best traction.

It is still another object of this invention to provide a locking differential that is automatically operable yet one that is arranged to operate only when there is a loss of tractive resistance at one or the other of the driven wheels, said lock-up not being activated during vehicle cornering operations.

It is a further object of this invention to provide a differential mechanism wherein positive drive is accomplished by reason of variation in the pinion gear-side gear separating forces due to loss of tractive resistance at one of the driven wheels, said variation automatically activating a mechanism that locks up the differential gearing and provides a means for the delivery of a positive drive to each of the driven wheels regardless of loss of tractive resistance at one of the driven wheels.

It is still a further object of my invention to provide a friction bias locking differential that has the pinion gearing shiftably mounted therein so that the variation in side gear thrust applied thereto, when there is loss of tractive resistance at one or the other of the side gear connected driven wheels, causes movement of the shiftably mounted pinion gears and engagement of a friction cluch that locks up the gearing of the differential mechanism so that a positive drive may be transmitted to the driven wheel having the greatest tractive resistance.

Other objects and advantages of this invention will become readily apparent from a reading of the following description and a consideration of the related drawings wherein:

Fig. 2 is a sectional elevational view taken along the line 2—2 of Fig. 1;

Fig. 3 is a fragmentary sectional elevational view taken along the line 3—3 of Fig. 1;

Fig. 4 is a fragmentary sectional elevational view of a portion of the differential gearing when it has been automatically locked up for the transmission of a positive drive to each of the driven members at a time when one of the driven wheels has lost at least a portion of its tractive resistance;

Fig. 5 is an exploded perspective view of the differential case, the clutch blocks and differential case sleeve that are utilized in the disclosed differential mechanism; and Fig. 6 is a fragmentary sectional elevational view, similar to Fig. 4 showing a modified form of this invention.

Figure 1:
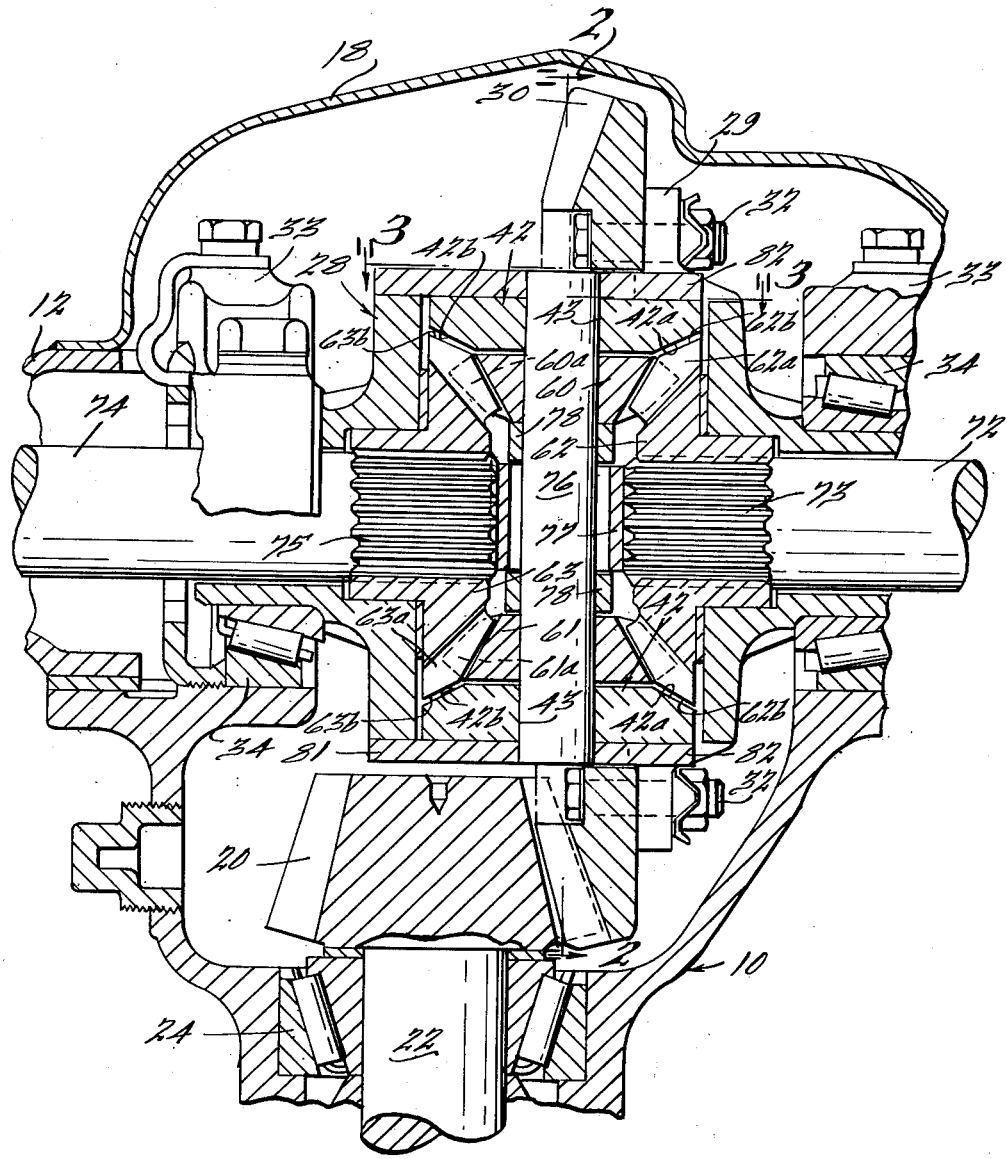
Fig. 1 is a fragmentary sectional elevational view of a differential mechanism and portions of an associated axle housing embodying this invention, this view showing the differential gearing arranged for the transmission of equal torque to each axle.

Referring to the drawings, the numeral 10 represents the drive pinion and differential carrier case unit that has the more or less conventional axle housing 12 suitably connected thereto. The rear central portion of the axle housing 12 has an opening therein adapted to be closed by a cover plate 18 that is detachably secured to the housing 12 by means not shown. A drive pinion shaft 22 is journaled in a bearing assembly 24 that is mounted in the carrier unit 10. Pinion shaft 22 has the axle drive pinion 20 drivingly mounted on its rear end portion. A substantially cylindrical, closed end, differential case 28 is rotatably supported from the rear portion of the carrier unit 10 by means of a pair of roller-type differential bearing assemblies 34. The bearing assemblies 34 are connected to the carrier unit 10 by conventional bearing caps 33. Differential case 28 carries a ring gear 30 that is fixedly secured thereto by the bolts 32 which penetrate openings in a radially extending flange 29 on the carrier case 28. Ring gear 30 is positioned so as to meshingly engage the drive pinion 20 and thereby transmit rotary motion to the differential case 28.

The closed end, substantially cylindrical, differential case 28 has its inner surface portions machined to journal at opposite sides thereof the pair of side gears 62, 63. An axle 72 is connected by splines 73 to the side gear 62 so that drive may be transmitted from the side gear 62 to a driven wheel (not shown) carried by the outer end of the axle 72. The other side gear 63 has an axle 74 connected thereto by splines 75 so that drive may be transmitted from the side gear 63 to another driven wheel (not shown) mounted on the outer end of the axle 74.

As can be readily observed from Fig. 5, the closed end, substantially cylindrical, differential case 28 has a pair of rectangularly shaped openings 41 broached in diametrically opposite side portions thereof. These openings 41 in the differential case 28 each receive a clutch block 42 that is of rectangular plan configuration and of such size as to be shiftable axially of the differential case 28 within the openings 41. However, the blocks 42 are prevented from movement in any other direction relative to the case 28. Each of the brake blocks 42 is pierced by a bore 43 which is of such size as to matingly receive an end of the differential pinion shaft 76. Differential pinion shaft 76 rotatably supports the pair of differential pinion gears 60, 61. These pinion gears 60, 61 are of such size and shape as to meshingly engage the gear teeth 62a and 63a respectively of the side gears 62, 63. Differential pinion gears 60, 61 are maintained in axially spaced apart relationship on the differential pinion shaft 76 by means of spacer blocks 77, 78, 78 that are loosely mounted on the differential pinion shaft 76 between the pinion gears 60, 61.

The brake blocks 42, 42 that are shiftably mounted in the broached openings 41, 41 of the differential gear case 28 are prevented from moving relative to the case 28, except in an axial direction, by virtue of the cylindrical sleeve or hoop element 81 (see Fig. 5 particularly). It will be noted from Fig. 5 that the sleeve 81 carries axially extending fingers or projections 82 at one end thereof. These projections 82 are shaped to fit in mating recesses or slots 29a formed in the radially extending flange 29 of carrier case 28. The sleeve or hoop 81 is of such size that it may float or shift axially of the carrier case 28 to a limited degree. However, the interengaged sleeve fingers 82 and case recesses 29a prevent relative rotation between the sleeve 82 and the carrier case 28. It will be noted that the ring gear 30 and its mounting bolts 32 are arranged such that in assembled position portions thereof overlap the opposite ends of the differential pinion shaft 76 and thereby prevent the shaft 76 from sliding out of its assembled position within the differential case 28.

It will be noted from Fig. 1 that the differential pinion gears 60, 61 have teeth 60a and 61a respectively that are in continuous meshing engagement with the teeth 62a and 63a of the side gears 62, 63. The teeth 62a, 63a of the side gears 62, 63 are extended radially outwardly beyond their engagement areas with the pinion gear teeth 60a, 61a so that their exposed end edges provide clutch engagement surfaces 62b and 63b respectively. These clutch engagement surfaces 62b, 63b, on the periphery of the side gears 62, 63, are arranged for clutching engagement with the chamfered clutch surfaces 42a and 42b formed on the ends of the clutch blocks 42. It is thought to be obvious from Fig. 1, that when each of the driven axles 72, 74 is loaded, by tractive resistance or the like, that then torque from pinion shaft 22 will be transmitted equally to each of the driven axles 72, 74 through the side gears 62, 63 respectively. At such times the separating forces between the engaged teeth of the opposed side gears 62, 63 and the pinion gears 60, 61 are equal and opposite so that the pinion gears 60, 61 are centrally positioned as shown in Figs. 1 and 3. Under such conditions the clutching surfaces 42a and 42b of the clutch blocks 42 are each disengaged from the side gear clutching surfaces 62b, 63b, respectively, and the differential mechanism functions in its normal manner.

If a condition should arise where one of the axle shafts 72 or 74 is not loaded, as when a vehicle driven wheel is raised off the ground or one wheel is spinning on ice, sand, mud or the like, then there is a difference in the gear separating forces acting on the side gears 62, 63 on opposite sides of the differential mechanism. Under such circumstances the unloaded axle and its side gear do not exert a sufficient separating force on the pinion gears 60, 61 to balance the separating force developed by the tractable wheel and axle on the other side gear and as a result the traction loaded side gear will urge the pinion gears 60, 61 and their attached pinion gear shaft 76 and clutch blocks 42, 42 towards the unloaded side gear and cause engagement of the clutching surface 62b or 63b of the unloaded side gear with the mating clutching surface 42a or 42b of the clutch blocks 42 (see Fig. 4 for an example). On engagement of one or the other of the clutch block clutching surfaces 42a or 42b with one or the other of the side gear clutching surfaces 62b or 63b, the gearing of the differential mechanism is locked up and the unloaded axle no longer dissipates the torque being transmitted to the differential mechanism is locked up and the unloaded axle no longer dissipates the torque being transmitted to the differential gearing by the drive pinion 20. Instead, the torque from the drive pinion 20 is now positively transmitted through the locked up differential gearing to the traction loaded side gear and the vehicle is mobile even though one driven wheel has little or no tractive resistance. As soon as the locked up differential has caused the traction loaded wheel to move the vehicle to a location where both wheels are provided with traction resistance, then gear separating forces of substantially equal intensity and opposite directions are immediately developed at the side gears 62, 63 and the pinion gears 60, 61 with their attached pinion shaft 76 and clutch blocks 42, 42 are centered once again to their Fig. 1 position. From the above discussion it is obvious that the lock-up and unlocking of the differential gearing is completely automatic and that this operation is accomplished only at those times when it is absolutely necessary, that is, when there has been a change in tractive resistance at one or the other of the driven wheels.

Fig. 4 shows the condition of this friction biased locking differential when the tractive resistance or load applied to axle 72 has been reduced or dissipated. Loaded side gear 63 now develops gear separating forces that cause the pinion gear shaft 76, and its mounted pinion gears 60, 61 and clutch blocks 42, 42 to shift rightwardly towards the less loaded or the unloaded side gear 62 until the clutch block friction surfaces 42a clutchingly engage the side gear clutching surfaces 62b and cause a lock-up of the differential gearing. It will be noted from Fig. 4 that the spacing has increased between the clutching surfaces 42b, 63b at the left side of the pinion 61 whereas the clutching surfaces 42a and 62b are now frictionally engaged.

From the above description of the form of the invention shown in Figs. 1-5, it will be obvious that an automatically operable friction biasing locking or positive drive differential has been provided. This differential uses practically all of the standard parts of a conventional differential and requires very few additional parts and practically no additional space. Essentially the only changes required in converting a standard differential to a differential embodying this invention are to broach clutch block openings 41 in the differential case, provide the clutch blocks 42, 42 and the sleeve 81 and modify the side gears 62, 63 to include the friction surfaces 62b, 63b. Pinion gears 60, 61 must be reduced in size also for they are now seated against the inside surfaces of the clutch blocks 42 rather than against the inside surface of the differential case 28.

Due to the sleeve 81 being connected to the pinion shaft 76 which also mounts the clutch blocks 42, 42, it is obvious that this pinion shaft mounted assembly is free to float as a unit and there is no relative sliding between these elements as the side gear-pinion gear separating forces vary. This keeps friction losses to a minimum and makes the locking action of the differential more positive. The arrangement whereby the sleeve 81, the clutch blocks 42, 42, the pinion shaft 76 and the pinion gears 60, 61 float axially of the differential case 28 balances out undesired friction that would otherwise develop due to pinion gear thrust and the wedging action of the clutching surfaces 42a, 42b, 62b, 63b. As a result, an increased clutch holding action is achieved for locking up the differential gearing.

Fig. 6 shows a modified form of the invention wherein the sleeve 181 is fixedly connected to the differential case 28 by the bolts 32. To prevent the development of undesirable friction forces between the floating clutch blocks 142 (only one shown) and the anchored sleeve 181, ball or roller means 150 are provided between these relatively movable surfaces. These ball or roller means 150 can be mounted in any sort of a retainer or in grooves 151 formed in the clutch blocks 142 or in the fixed sleeve 181. In all other respects the Fig. 6 form of the invention is similar to the form shown in Figs. 1–5 and similar reference numerals have been used to indicate identical parts.

While this differential mechanism has been described as applied to a motor vehicle drive train, there is no intenion to limit the scope of application in any manner except as set forth in the claims. It is thought to be obvious that the friction bias locking means for a differential mechanism may have innumerable applications in all sorts of drive trains other than motor vehicle drive trains if torque is divided between more than one relatively movable output member. Furthermore, while only two forms of friction clutch mechanisms have been shown in this application, still it is thought to be obvious that many other types of friction or positive clutches could be activated by the shiftable pinion gear-pinion shaft assembly herein disclosed.

A point that should be noted in closing is that the disclosed differentials are arranged such that the torque unbalance on loss of tractive resistance at one wheel does not cause lock-up of the differential gearing until the torque input to the system exceeds the usable torque output of the wheel with the least tractive resistance. It is not until this latter condition exists that the unbalanced gear separating forces effect lock-up of the differential gearing. Thus, if the torque input is low and some torque unbalance does exist between the two driven wheels, still, conditions could be such that the gear separating forces would not be sufficent to cause a differential lock-up and a drive through the unlocked differential could be achieved if the load were light.

I claim:

1. A differential mechanism comprising a case, a pair of opposed, spaced, side gears journaled therein and restrained against separating axial movement, pinion gearing journaled in said case on a floating axis that is constrained from non-tilting, shifting movement axially of the side gears and arranged between and in continuous meshing engagement with said side gears, drive transmitting means connected to each of said side gears to provide for the application of separate loads to each of said side gears, the loading of said side gears developing forces between the side gears and the pinion gearing tending to shift said pinion gearing axially of the side gears, and clutch means activated solely by the axial shift of said pinion gearing to effect the transmission by said differential mechanism of a positive drive to each of the drive transmitting means when one of said drive transmitting means is loaded to a lesser degree than the other.

2. A differential mechanism comprising a case, a pair of opposed, spaced, side gears journaled therein and restrained against separating axial movement, pinion gearing journaled in said case on a floating axis that is constrained for non-tilting, shifting movement axially of the side gears and arranged between and in continuous meshing engagement with said side gears, drive transmitting means connectced to each of said side gears to provide for the application of separate loads to each of said side gears, the loading of said side gears developing forces between the side gears and the pinion gearing tending to shift said pinion gearing axially of the side gears, and friction clutch means activated solely by the axial shift of said pinion gearing to effect the lock-up of said side gears and pinion gearing and the transmission by said differential mechanism of a positive drive to each of the drive transmitting means when one of said drive transmitting means is loaded to a lesser degree than the other.

3. A differential mechanism comprising a case, a pair of opposed, spaced, side gears journaled therein and restrained against separating axial movement, pinion gearing journaled in said case on a floating axis that is constrained for nontilting, shifting movement axially of the side gears and arranged between and in continuous meshing engagement with said side gears, drive transmitting means connected to each of said side gears to provide for the application of separate loads to each of said side gears, the loading of said side gears developing opposed gear separating forces between the side gears and the pinion gearing tending to shift said pinion gearing axially of the side gears, and friction clutch means activated solely by the axial shift of said pinion gearing upon variation in the intensity of the gear separating forces developed by the side gears to effect the lock-up of the engaged side gears and pinion gearing and the transmission by said differential mechanism of a positive drive to each of the drive transmitting means when one of said drive transmitting means is loaded to a lesser degree than the other.

4. In a differential mechanism, a case mounting a ring gear that is arranged to transmit rotary motion to said case, a pair of spaced, opposed, side gears journaled in said case with each side gear drivingly connected to a different driven member and restrained against separating axial movement, differential pinion gearing shiftably mounted in said case on axes constrained for non-tilting movement axially of said side gears, said pinion gearing being continuously meshingly engaged between said spaced side gears, and clutch means activated solely by the axial shifting movement of the pinion gearing to provide for the transmission of a positive drive from the ring gear to each of the driven members when one of the driven members tends to dissipate the torque applied thereto.

5. In a differential mechanism, a case mounting a ring gear that is arranged to transmit rotary motion to said case, a pair of spaced, opposed, side gears journaled in said case with each side gear drivingly connected to a different driven member and restrained against separating axial movement, differential pinion gearing shiftably mounted in said case on axes constrained for non-tilting movement axially of said side gears, said pinion gearing being continuously meshingly engaged between said spaced side gears, and clutch means activated solely by the axial shifting movement of the pinion gearing on variation in the separating forces developed between each of the opposed side gears and the engaged pinion gearing on variation in loading of the driven members to lock up the gearing and provide for the transmission of a positive drive from the ring gear to each of the driven members when one of the driven members tends to dissipate the torque applied thereto.

6. In a differential mechanism, a case mounting a ring gear that is arranged to transmit rotary motion to said case, a pair of spaced, opposed, side gears journaled in said case with each side gear drivingly connected to a different driven member and restrained against separating axial movement, differential pinion gearing shiftably mounted in said case on axes constrained for non-tilting movement axially of said side gears, said pinion gearing being continuously meshingly engaged between said spaced side gears, and clutch means activated solely by the axial shifting movement of the pinion gearing to provide for the transmission of a positive drive from the ring gear to each of the driven members when one of the driven members tends to dissipate the torque applied thereto.

7. In a differential mechanism, a case mounting a ring gear that is arranged to transmit rotary motion to said case, a pair of spaced, opposed, side gears journaled in said case with each side gear drivingly connected to a different driven member and restrained against separating axial movement, differential pinion gearing shiftably mounted in said case on axes constrained for non-tilting movement axially of said side gears, said pinion gearing being continuously meshingly engaged between said spaced side gears, and friction clutch means activated solely by the axial shifting movement of the pinion gearing to drivingly engage certain of the gearing and provide for the transmission of a positive drive from the ring gear to each of the driven members when one of the driven members tends to dissipate the torque applied thereto.

8. In a differential mechanism, a case mounting a ring gear that is arranged to transmit rotary motion to said case, a pair of spaced, opposed, side gears journaled in said case with each side gear drivingly connected to a different driven member and restrained against separating axial movement, differential pinion gearing shiftably mounted in said case on axes constrained for non-tilting movement axially of said side gears, said pinion gearing being continuously meshingly engaged between said spaced side gears, and clutch means activated solely by the axial shifting movement of the pinion gearing to lock-up the engaged side gears and pinion gearing and to provide for the transmission of a positive drive from the ring gear to each of the driven members when one of the driven members tends to dissipate the torque applied thereto.

9. In a differential mechanism, a case mounting a ring gear that is arranged to transmit rotary motion to said case, a pair of spaced, opposed, side gears journaled in said case with each side gear drivingly connected to a different driven member and restrained against separating axial movement, each side gear being formed with a friction clutch surface, differential pinion gearing shiftably mounted in said case on axes constrained for non-tilting movement axially of the side gears, said pinion gearing being continuously meshingly engaged between said spaced side gears, and friction clutch means activated solely by the axial shifting movement of the pinion gearing selectively engageable with the clutch surfaces on one or the other of the side gears to lock up the differential gearing and to provide for the transmission of a positive drive from the ring gear to each of the driven members when one of the driven members tends to dissipate the torque applied thereto.

10. In a differential mechanism having pinion gearing meshingly engaged between a pair of spaced, opposed side gears that are fixed against separating axial movement, said pinion gearing being floatingly mounted between said side gears on rotational axes constrained for non-tilting, axial movement relative thereto such that the variation in the gear separating forces developed between the opposed side gears and the pinion gearing on variation in loading of the side gears tends to shift said pinion gearing axially of the side gears; a means activated by the axial shift of said floatingly mounted pinion gearing to effect lock-up of the engaged side gears and pinion gearing.

11. In a differential mechanism, a case mounting a ring gear that is arranged to transmit rotary motion to said case, a pair of spaced, opposed, side gears journaled in said case with each side gear drivingly connected to a different driven member and restrained against separating axial movement, differential pinion gearing shiftably mounted in said case for movement axially of the side gears, said pinion gearing being continuously meshingly engaged between said spaced side gears, and friction clutch means connected to said pinion gearing and actuated by the shifting movement of the pinion gearing axially of the side gears to engage side gear mounted clutch portions to cause a lock-up of the differential gearing and provide for the transmission of a positive drive from the ring gear to each of the driven members when one of the driven members tends to dissipate the torque applied thereto.

12. In a differential mechanism, a case mounting a ring gear that is arranged to transmit rotary motion to said case, a pair of spaced, opposed, side gears journaled in said case on axes that are coaxial with the case rotational axis, each side gear being drivingly connected to a different driven member and restrained against side gear separating axial movement, a differential pinion gear shiftably mounted in said case on an axis constrained for non-tilting movement axially of the side gears, said pinion gear being continuously meshingly engaged between said spaced side gears, and friction clutch means on said gears activated solely by the shifting movement of the pinion gear axially of the side gears upon variation in the forces simultaneously applied thereto by the side gears, when the driven members are loaded to different degrees, to cause lock-up of the differential side gears and the pinion gear.

13. In a differential mechanism, a case mounting a ring gear that is arranged to transmit rotary motion to said case, a pair of spaced, opposed, side gears journaled in said case on axes that are coaxial with the case rotational axis, each side gear being drivingly connected to a different driven member, a differential pinion gear shiftably mounted in said case for movement axially thereof, said pinion gear being continuously meshingly engaged between said spaced side gears, and means activated by the shifting axial movement of the pinion gear upon variation in the forces simultaneously applied thereto by the side gears, when the driven members are loaded to different degrees, to cause lock-up of the differential side gears and the pinion gear, said means comprising a clutch block mounted in said case for shiftable movement axially thereof, said clutch block being connected to said pinion gearing for movement therewith and including clutch means to lock certain of said gears to said case and thereby effect the aforementioned lock-up.

14. In a differential mechanism, a case mounting a ring gear that is arranged to transmit rotary motion to said case, a pair of spaced, opposed, side gears journaled in said case on axes that are coaxial with the case rotational axis, each side gear being drivingly connected to a different driven member and including a clutch surface, a differential pinion gear shiftably mounted in said case for movement axially thereof, said pinion gear being continuously meshingly engaged between said spaced side gears, and means activated by the shifting axial movement of the pinion gear to lock-up the differential gears and provide for the transmission of a positive drive from the ring gear to each of the driven members when one of the driven members is loaded to a lesser degree than the other, said means comprising a clutch block connected to said pinion gear and shiftable therewith in directions axially of the case, said clutch block having clutching surfaces adapted to be selectively engaged with the clutch surface on one or the other of the side gears when there is a variation between the loads applied to the opposed side gears by their connected driven members.

15. In a differential mechanism, a substantially cylindrical case arranged for rotational movement about its longitudinal axis, a pair of spaced, opposed, side gears journaled in said case for rotation about axes coaxial with the case rotational axis, each of said side gears being formed with a friction clutching surface, a differential pinion gear arranged between and in continuous meshing engagement with said opposed side gears, said pinion gear being floatingly mounted in said case for limited movement axial thereof, an opening in said case loosely receiving a friction clutch block and arranged to restrict movement of the clutch block to movement axially of the case, said clutch block having a pair of friction clutching surfaces thereon each of which is adapted to be selectively engaged with the friction surface on one of the side gears as the pinion gear is shifted axially of the case, a sleeve member encircling and axially shiftable on said case, said sleeve member being arranged to retain said clutch block in position in the case opening, and shaft means journaling said pinion gear in said case and connecting said pinion gear to said clutch block and to said sleeve member to transmit the axial movement of the pinion gear to the connected block and sleeve member.

16. In a differential mechanism, a substantially cylindrical case arranged for rotational movement about its longitudinal axis, a pair of spaced, opposed, side gears journaled in said case for rotation about axes coaxial with the case rotational axis, each of said side gears being formed with a friction clutching surface, a differential pinion gear arranged between and in continuous meshing engagement with said opposed side gears, said pinion gear being floatingly mounted in said case for limited movement axal thereof, an opening in said case loosely receiving a friction clutch block and arranged to restrict movement of the clutch block to movement axially of the case, said clutch block having a pair of friction clutching surfaces thereon each of which is adapted to be selectively engaged with the friction surface on one of the side gears as the pinion gear is shifted axially of the case, a sleeve member encircling said case and fixed thereto, said sleeve member being arranged to retain said clutch block in position in the case opening, friction reducing means positioned between the clutch block and the sleeve member to permit relative movement therebetween in directions axially of the case, and shaft means journaling said pinion gear in said case and connecting said pinion gear to said clutch block for transmission of the axial movement of said pinion gear to said clutch block.

References Cited in the file of this patent

UNITED STATES PATENTS

| | | |
|---|---|---|
| 2,769,353 | Nash | Nov. 6, 1956 |

FOREIGN PATENTS

| | | |
|---|---|---|
| 499,048 | Great Britain | Jan. 18, 1939 |
| 654,224 | Germany | Dec. 18, 1937 |
| 736,780 | Germany | June 28, 1943 |
| 1,102,679 | France | May 11, 1955 |